United States Patent [19]

Gabeler

[11] 4,121,121

[45] Oct. 17, 1978

[54] FOLLOWER RESPONSE CONTROL CIRCUIT

[75] Inventor: Stephen Chester Gabeler, Sudbury, Mass.

[73] Assignee: Computer Identics Corporation, Westwood, Mass.

[21] Appl. No.: 832,934

[22] Filed: Sep. 13, 1977

[51] Int. Cl.² ........................ H03K 5/01; H03K 5/08
[52] U.S. Cl. ................................. 307/358; 307/351; 307/354; 307/360; 328/151
[58] Field of Search ............... 307/350, 351, 354, 358, 307/359, 360; 328/115–117, 146–149, 151; 340/146.3 AC, 146.3 AE, 146.3 AG

[56] References Cited

U.S. PATENT DOCUMENTS

| 3,566,281 | 2/1971 | Baumann | 307/358 X |
| 3,832,577 | 8/1974 | Harr | 307/358 X |
| 3,846,623 | 11/1974 | Wefers et al. | 307/359 X |

*Primary Examiner*—John Zazworsky
*Attorney, Agent, or Firm*—Joseph S. Iandiorio

[57] ABSTRACT

A follower response control circuit for a reference level establishing system having positive and negative follower circuits, each having means for defining a pre-established time constant producing, respectively, a positive peak signal and a negative peak signal in response to an input signal, and means responsive to the peak signals for establishing a reference level, including means for defining a second time constant for one of the follower circuits; switching means for selectively switching the means for defining a second time constant in and out of that one of the follower circuits; a direction detector circuit for determining whether the input signal level is moving toward the polarity of the peaks followed by that one of the follower circuits; a level detector circuit for determining whether the input signal is of the same polarity of the peaks followed by that one of the follower circuits; and a switch control responsive to the detector circuit for operating the switching means to introduce the means for defining a second time constant into that one of the follower circuits to alter temporarily the pre-established time constant of that follower circuit during the period when the input signal level is moving toward, and is the same polarity relative to the reference level as, the polarity of the peaks followed by that one of the follower circuits.

8 Claims, 5 Drawing Figures

FOLLOWER RESPONSE CONTROL CIRCUIT

FIELD OF THE INVENTION

This invention relates to a follower response control circuit for a reference level establishing system.

BACKGROUND OF INVENTION

In many code reading systems information is represented by relative characteristics of the bits, such as light and dark, black and white, magnetic and non-magnetic (less magnetic), retroreflective and non-retroreflective, red and blue, as well as by the relative size of the bits. The signal from the reader represents the contrasting characteristics by its positive and negative levels. In order to determine whether a bit is in one category or the other in such relationships, e.g. black or white, it is necessary to compare the reader signal with a reference or threshold level. If it is greater than the reference it is one characteristic, i.e. white; if less, black. However, due to variations in: circuit operation and supply; distance and orientation between the reader and code; contrast levels of the code bits; condition of the code elements, e.g. dirty, torn, obliterated; the "black" and "white" levels actually can vary greatly. Thus in some cases the reference level may be so high or so low that the different bits are not recognized. Further, in many cases, such as where the size as well as the nature of the bits is important, even small variations in the reference level relative to the reader signal level can be extremely significant: the measurement of the size of the bits always should be taken at the same relative level of the reader signal, optimally the one half amplitude point.

To attempt to overcome these problems, in some systems a variable reference level is provided by a system which tracks or follows the upper (positive) and lower (negative) levels of the signal and produces a third signal at some intermediate level, e.g. midway between. These positive and negative follower circuits typically use a storage device, e.g. an R.C. network, to store the peak positive and negative levels. The capacitor in the positive follower circuit charges to the positive peaks and discharges between them while the negative follower discharges to the negative peaks and charges between them. With no coded label present, i.e. with the reader viewing "free air", the reader signal is at either a generally positive or negative level: with an optical reader of black and white codes on a white label, where black or minimum light return to the reader is negative, the "free air" signal is negative. Thus the positive peak and negative peak signals initially follow the reference signal closely, with the negative peak signal generally at the level of the reader input signal in the "free air" condition. Subsequently, when the reader encounters the white label, the reader signal goes positive and the positive follower tracks it. However, in the meantime the negative peak signal continues to increase in the positive direction as the negative follower circuit charges. Thus, if the time constant of the negative follower circuit is perfectly suited to this system, label, and all the relevant conditions, then when the first black code is reached the negative peak signal intersects with the reader signal at the negative peak of the reader signal. But this is never the case. Either the negative follower time constant is too fast, in which case it intersects the reader signal above the negative peak and thus establishes the reference level higher, more positive, than it should be and results in a wider apparent width of the black bit; or the negative follower time constant is too slow, in which case it may not intersect the reader signal until all or a number of the bits have been read and thus establishes the reference level lower, more negative than it should be and results in a narrower apparent width of the black bit. Attempts to overcome this difficulty have resulted in systems in which the various time constants, reference levels and other critical settings have been made adjustable. In this approach, each system must be fine tuned for internal system differences and for the particular labels, environment and manner in which it is to be used. But, even then, the variations in label quality, condition and orientation, system components and ambient conditions require constant attention and returning to maintain satisfactory operation.

SUMMARY OF INVENTION

It is therefore an object of this invention to provide an improved, simple but extremely effective follower response control circuit for a reference level establishing system.

It is a further object of this invention to provide such a follower response control circuit which automatically tailors the time constant of a follower circuit to minimize reference level error.

It is a further object of this invention to provide such a follower response control circuit which confines the input signal to an optimum range for processing by said follower circuits and follower response control circuit.

It is further object of this invention to provide an improved, simple but extremely effective follower response control circuit for a code reading system.

This invention results from the realization that a follower response control circuit can be provided which automatically tailors the response time of a peak follower circuit in a reference level system to compensate for internal and external variables by switching between a slower and a faster time constant network in response to the input signal level moving toward, and the input signal level being of the same polarity relative to the reference level as, the polarity of the peaks followed by the follower circuit.

This invention features a follower response control circuit for a reference level establishing system. The reference level establishing system may include positive and negative follower circuits, each having means for defining a pre-established time constant for producing, respectively, a positive peak signal and a negative peak signal in response to an input signal. The reference level establishing system also includes means responsive to the peak signals for establishing a reference level. The follower response control circuit includes means for defining a second time constant for one of the follower circuits. There are switching means for selectively switching the means for defining a second time constant in and out of that follower circuit. A direction detector circuit determines whether the input signal is moving toward the polarity of the peaks followed by that one of the follower circuits. A level detector circuit is provided for determining whether the input signal level is of the same polarity relative to the reference level as the polarity of the peaks followed by that one of the follower circuits. Finally, there is a switch control responsive to the detector circuits for operating the switching means to introduce the means for defining a second time constant into that one of the follower circuits in order to alter temporarily the pre-established time constant of that follower circuit during the period when the input signal level is moving toward, and is of the same polarity relative to the reference level as, the polarity of the peaks followed by that one of the follower circuits.

In preferred embodiments, the direction detector circuit may be a differentiator circuit, the level detector circuit may be a comparator, and the switch control circuit may be a logic gate. Also in a preferred embodiment, there are means for defining the input signal peaks within predetermined limits, including means for shifting the input signal by a fixed value and means for restoring the shifted input signal to a fixed d.c. level independent of the original level of the input signal.

In a specific embodiment, the one of the peak follower circuits controlled by the follower response control circuit is the negative peak follower circuit, the direction detector circuit detects the input signal going negative, and the level detector circuit detects the negative level relative to the reference level.

DISCLOSURE OF PREFERRED EMBODIMENT

Other objects, features and advantages will occur from the following description of a preferred embodiment and the accompanying drawings, in which.

Figure 1:
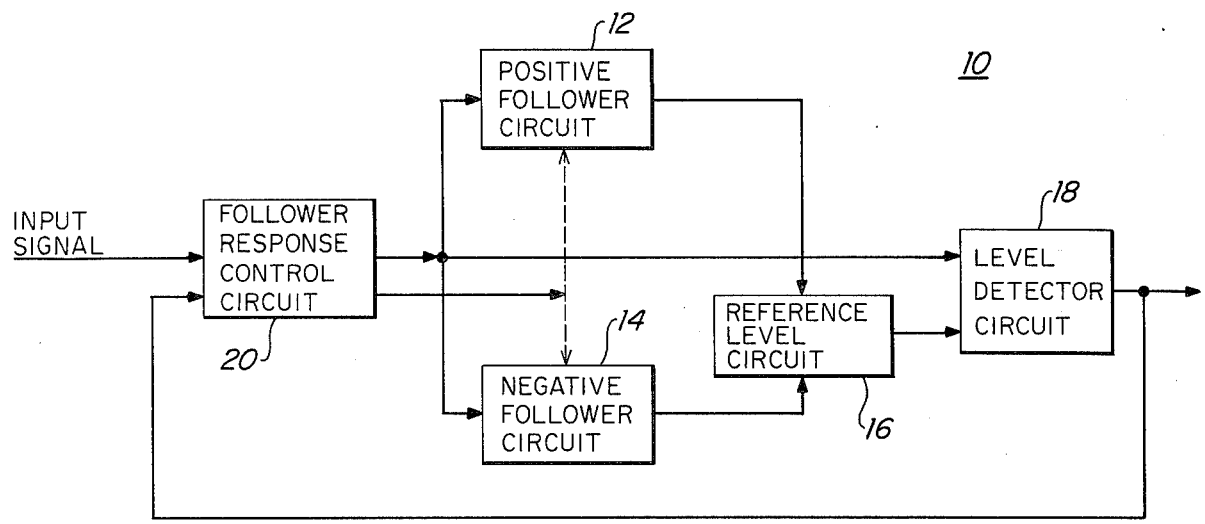
FIG. 1 is a simplified block diagram of a follower response control circuit in a reference level system according to this invention.
Figure 2:
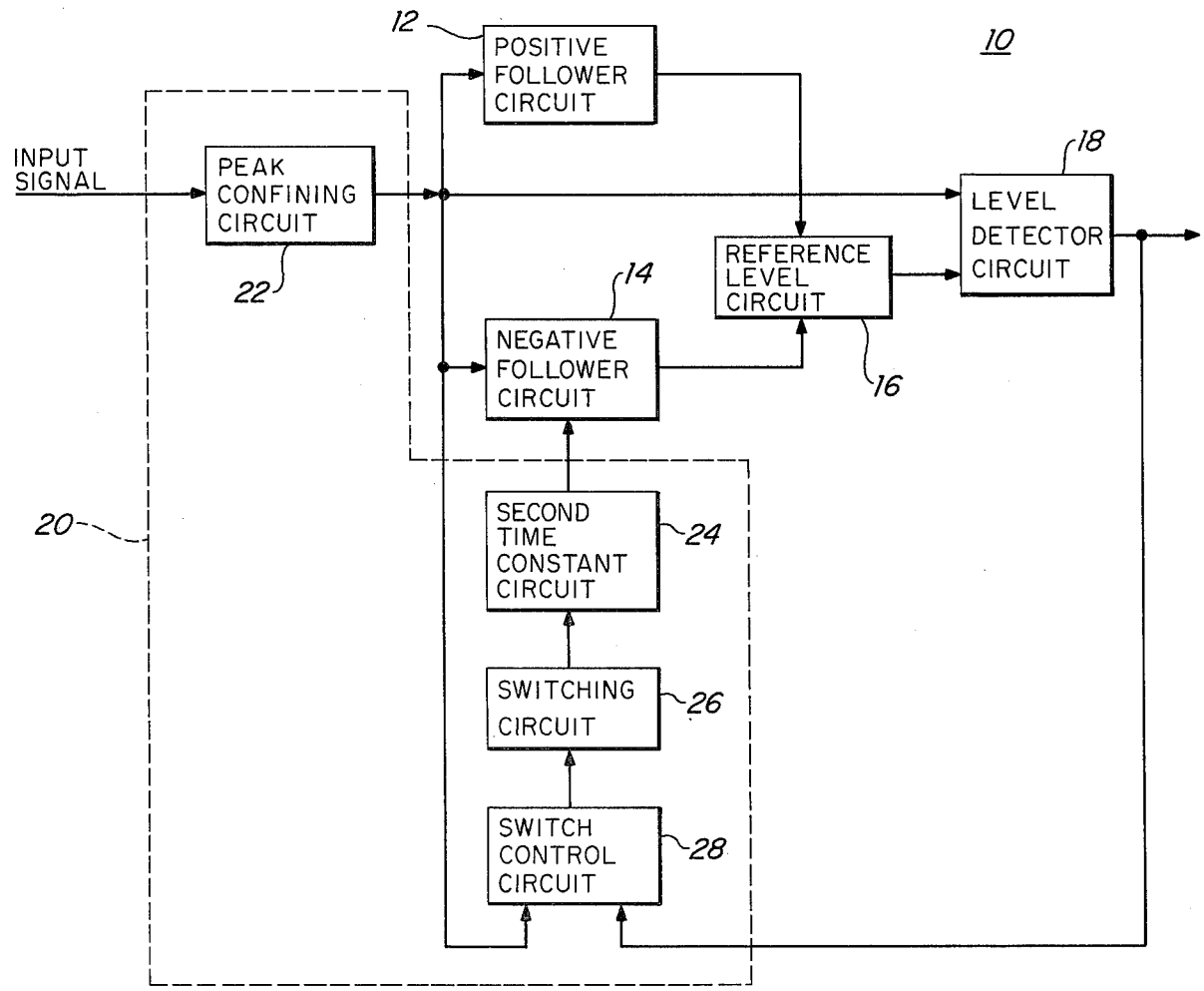
FIG. 2 is a block diagram similar to FIG. 1, with the follower response control circuit shown in greater detail.

The invention may be accomplished in a reference voltage system 10, FIG. 1, including positive follower circuit 12 and negative follower circuit 14, which provide a positive peak following signal and negative peak following signal to reference level circuit 16, which combines them to provide a reference signal to level detector circuit 18. Before being submitted to follower circuits 12 and 14 and level detector circuit 18, the input signal is confined within certain limits by follower response control circuit 20. Follower response control circuit 20 also is used to control the time constant applied by the positive follower circuit 12 or negative follower circuit 14, in response to the input signal to follow response control circuit 20 and the output signal from level detector circuit 18. The control of the input signal by follower response control circuit 20 is achieved through peak confining circuit 22, FIG. 2, while the control of the time response of the follower circuit is provided by second time constant circuit 24, which is connected and disconnected to one of the follower circuits by means of switching circuit 26 as supervised by switch control circuit 28, which responds to the input signal to follower response control circuit 20 and the output signal of level detector 18. In FIG. 2, follower response control circuit 20 is shown controlling the time constant of negative follower circuit 14.

Figure 3:
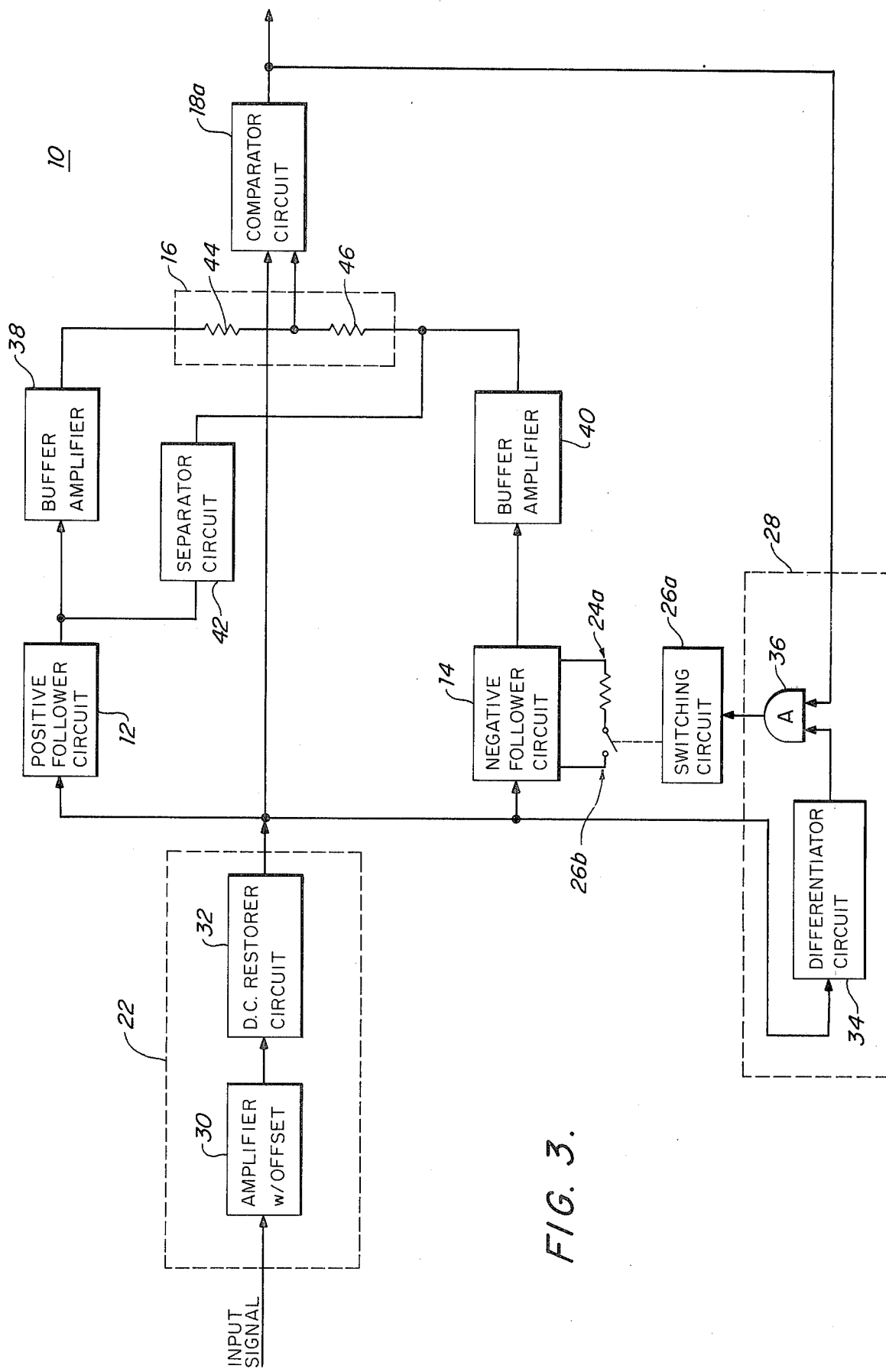
FIG. 3 is a block diagram similar to that of FIG. 2 showing certain circuits in additional detail.

Peak confining circuit 22 includes an amplifier with offset 30, FIG. 3, which produces a negative 5 volt offset to the input signal and d.c. restorer circuit 32 which sets the maximum level of that offset input signal at ground. Second time constant circuit 24 is implemented by a resistor 24a which is connected across a parallel connected capacitor and resistor in negative follower circuit 14. Resistor 24a has a lower resistance than the resistor in negative follower circuit 14 so that when it is connected into negative follower circuit 14 across that resistance by the actuation of switch 26a, the time constant is shortened. In FIG. 3, switching circuit 26 is depicted as controlling a mechanical switch 26b. Switch control circuit 28 includes a differentiator circuit 34 which responds to a negative going level of the input signal to provide an input to AND gate 36, which produces an output to operate switching circuit 26a only when, in addition to the signal for differentiator circuit 34, there is also a signal from the output of comparator circuit 18a, functioning as a level detector circuit, indicating that the input signal is negative with respect to the reference level. System 10, FIG. 3, also includes buffer amplifiers 38 and 40 and a separator circuit 42, which functions to maintain a minimum voltage differential between the output of positive follower circuit 12 and negative follower circuit 14. Reference level circuit 16 may include a pair of resistors 44 and 46, which may be made equal to establish the reference level at the half amplitude point of the combination of the positive and negative peak signals.

Figure 4:
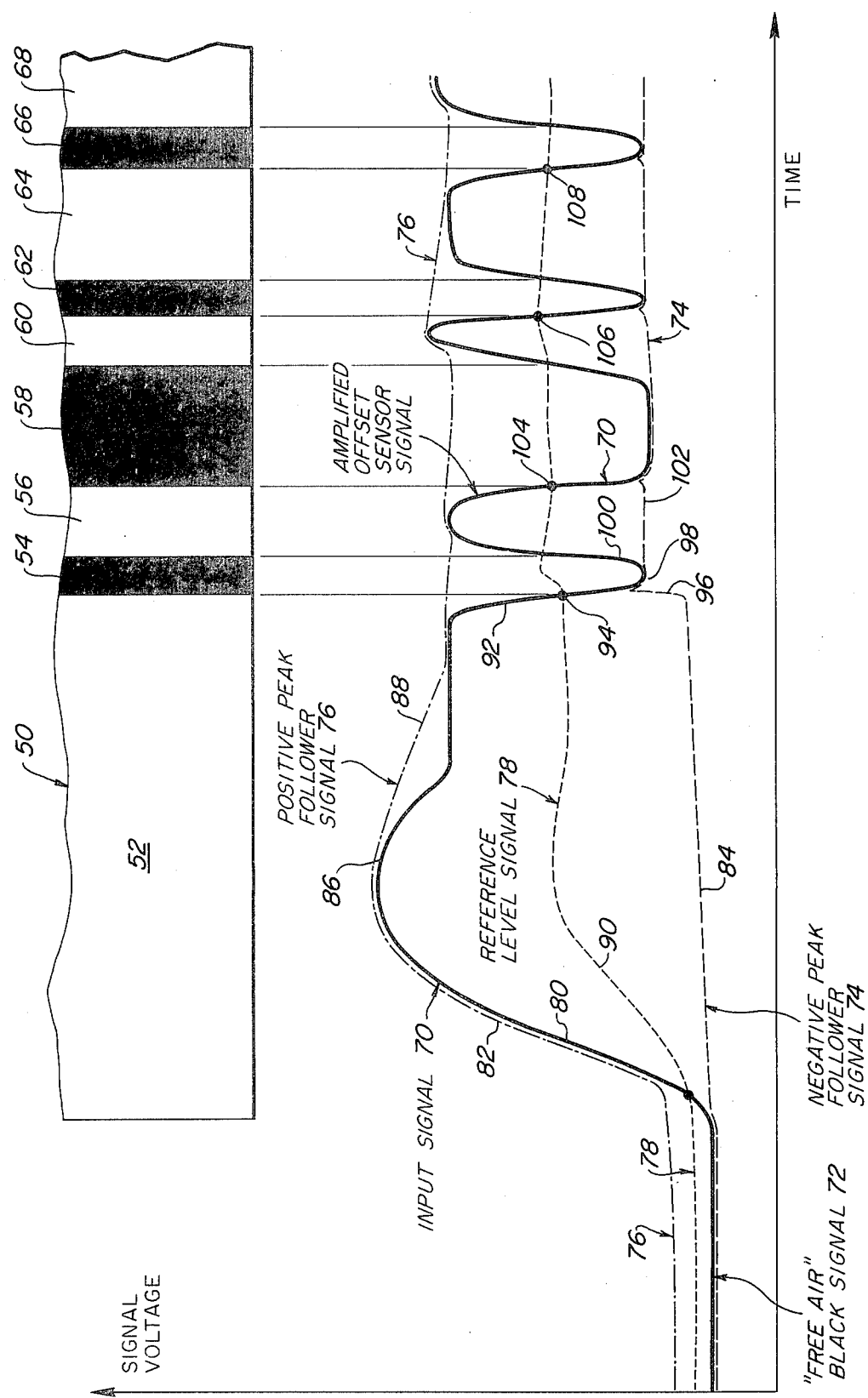
FIG. 4 is an illustration of a portion of a bar code label and the input signal that it produces which may be processed using the following response control circuit of this invention.

In operation, when reference level establishing system 10, FIG. 3, is used to read a white label 50, FIG. 4, including a leading white portion 52 followed by alternate black and white bars 54, 56, 58, 60, 62, 64, 66, 68, the input signal 70 appears as shown in FIG. 4. Initially when the reader sees no label and is exposed to the so-called free air, it produces a free air black signal level 72 of signal 70. At this point, the negative peak follower signal 74 is substantially at the same level, while the positive peak follower signal 76 is separated from it by a voltage determined by separator circuit 42. The combination of the two follower signals 74 and 76, where resistors 42 and 44 are equal, results in a reference level signal 78 which is midway between them. When the reader encounters the white portion 52 of label 50, the input signal 70 begins to rise along path 80 and positive peak follower signal 76 rises along with it, along path 82. Simultaneously, negative peak follower signal 74 follows path 84 independent of input signal 70, in response to the slow charging of the capacitor in negative follower circuit 14, which is operating in the slow time response mode. As white portion 52 is scanned, input signal 70 peaks and begins to decrease along path 86, while positive peak follower signal 76 decreases at a lower rate along path 88. Meanwhile, reference level signal 78 maintains a path 90 midway between the positive and negative peak follower signals 76 and 74.

When the first black bar 54 is encountered, input signal 70 begins to decrease along path 92. This causes differentiator circuit 34, FIG. 3, to produce one input to AND gate 36. When path 92 crosses reference level signal 90 at point 94, comparator circuit 18a, FIG. 3, produces its black output indicating that the input signal level has moved and is negative of the reference level signal 90. At this point the second input is provided to AND gate 36 and switching circuit 26a is enabled to close switch 26b, FIG. 3, and connect the lower resistance, resistor 24a, across the capacitor in the R.C. network in negative follower circuit 14, and place that circuit in the fast time response mode. At this point the negative peak follower signal 74 turns sharply upward along path 96 until it contacts the negative-going input signal 70 along path 92. Now the capacitor in negative follower circuit 14 begins to discharge until the peak negative point 98 is reached. At this point input signal 70 turns upward along a positive-going path 100 and the output from differentiator circuit 34 ceases so that AND gate disables switching circuit 26a and opens switch 26b to disconnect resistance 24a from the negative follower circuit 14. Negative peak follower circuit 74 now continues along path 102 in the slower time constant mode. This process is repeated beginning at each of the points 104, 106, 108.

Figure 5:
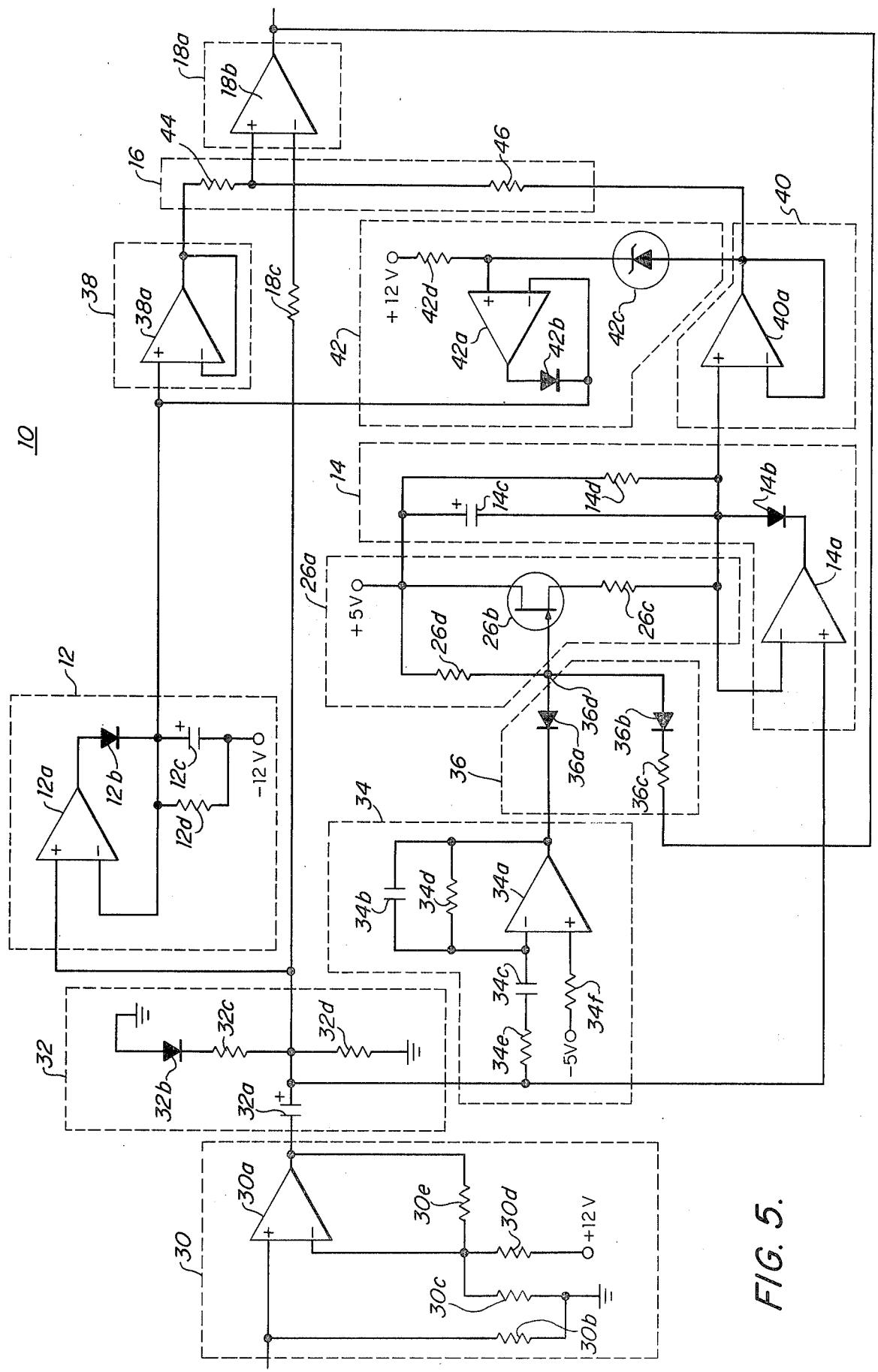
FIG. 5 is a more detailed schematic diagram shown in FIG. 3.

Reference level system 10 as shown in FIG. 3 may be implemented as shown in FIG. 5 for use in a reader system. There, amplifier offset 30 includes a non-inverting amplifier 30a having a gain of 50 and output offset of −5 volts, with the free air black input signal of −100 millivolts to +100 millivolts. The output is −10 volts to 0 volts, respectively.

Thus in this range of variation the free air black signal is always below ground reference level. The maximum white level for the input signal is determined when the free air black signal is +100 millivolts at the sensor or 0 volts at the amplifier 30a output. The maximum amplifier output is +10 volts, so that the maximum white signal is +200 millivolts at the sensor, above the previously assumed +100 villivolts free air black signal. Resistors 30b, 30c, 30d, and 30e are interconnected with amplifier 30a to produce the 50 gain and the −5 volt offset. D.C. restorer circuit 32 includes capacitor 32a connected to the output of amplifier 30a. When the output of amplifier 30a is below ground reference level, capacitor 30a charges through diode 32b, forward biased by resistor 32c, with a time constant determined by resistor 32c and capacitor 32a until the plus side of capacitor 32a is near ground reference level. This establishes an amplified and shifted free air black signal, which is always near 0 volts independent of the input signal within the plus-minus 100 millivolt range. When the input signal rises in response to a white surface, the output of amplifier 30a rises, both sides of capacitor 32a rise, and diode 32b becomes reversed bias. Capacitor 32a now discharges through resistor 32d with a time constant determined by resistor 32d and capacitor 32a, which is one thousand times larger than the time constant when diode 32b is forward biased. The time constant with resistor 32d is chosen to be many times longer than the typical duration of a coded label to be read. The signal on the positive side of capacitor 32a is thus an amplified version of the input signal with the free air black signal level set at zero volts.

Positive peak follower circuit 12 includes amplifier 12a and diode 12b connected to form a so-called "precision diode". Thus when the signal on the positive input of amplifier 12a is greater than that on the negative input, it appears that there is a short circuit across those inputs. The positive input of amplifier 12a is connected to the output of d.c. restorer circuit 32, the negative input of amplifier of input 12a is fed back from its own output, which is also delivered to the input of buffer amplifier 38.

Positive follower circuit 12 also includes capacitor 12c and resistor 12d, which establish the time constant of that circuit. When the input signal from d.c. restorer circuit 32 to amplifier 12a is greater than the level on capacitor 12c, it charges rapidly to that level. If the input is less than the level on capacitor, it discharges with a time constant set by resistor 12d and the capacitor 12c. This time constant is chosen so that it is greater than the typical time between white bars in a label. The output of this circuit thus follows the peak positive values of the input signal.

Buffer amplifier 38 may be simply a high input impedance unity gain amplifier 38a, which prevents the subsequent circuits from influencing the charging and discharging of capacitor 12c.

Negative follower circuit 14 is similar to positive follower circuit 12. It includes amplifier 14a, diode 14b, capacitor 14c, and resistor 14d. However, when the input signal at the positive input of amplifier 14a is less than the level of capacitor 14c, the positive and negative inputs of amplifier 14a appear as a short circuit. When the input signal to the positive input of amplifier 14a is greater than the level on capacitor 14c, the positive and negative inputs appear as an open circuit. Thus if the input signal to the positive input of amplifier 14a is less than the level on capacitor 14c, that capacitor charges rapidly to that level, and if the input is greater than the level of capacitor 14c, that capacitor discharges with the time constant determined by capacitor 14c and resistor 14d. This time constant is chosen such that it is much greater than the typical duration of an entire label.

Differentiator circuit 34 includes amplifier 34a, capacitors 34b and 34c, and resistors 34d, 34e and 34f. The output of amplifier 34a in this network is proportional to the rate of change at its negative input. When the signal is not changing, the output of amplifier 34a is a constant negative level; when the input is rising, the output goes negative in proportion to the rate of rise of the input; and when the input is falling the output goes positive in proportion to the rate of fall of the input.

AND gate 36 includes two diodes 36a and 36b; 36a is connected to the output of amplifier 34a, while 36b is connected through resistor 36c to the output of comparator 18a. When both those signals are positive, junction point 36d goes positive and enables switching circuit 26a.

Switching circuit 26a includes an FET 26b, which changes the time constant of negative follower circuit 14 by introducing a lower resistance resistor 26c in parallel with capacitor 14c and 14d. Resistor 26d is a biasing resistor for operating FET 26b. When the FET switch is on, the time constant of the negative follower circuit 14 is reduced by a factor of one thousand. With this reduction, the output of negative follower circuit 14 goes to the level of its input extremely rapidly, independently of whether the input is greater or less than the output. As indicated with respect to AND gate 36, two conditions must be met before the FET switch 26b closes and reduces the time constant. First, the input signal must be falling from positive toward negative as the surface of label 50, FIG. 4, changes from white to black. Second, comparator 18a output must be positive with respect to the reference level; that is, it must indicate black. Buffer amplifier 40 includes a high input impedance unity gain amplifier 40a similar to amplifier 38a.

Separator circuit 42 includes a so-called "precision diode" constituted by amplifier 42a and diode 42b in conjunction with a constant voltage source such as Zener diode 42c and resistor 42d. Separator circuit 42 functions to prevent the output of positive follower circuit 12 from decreasing below a fixed value set by Zener diode 42c above the output of negative follower circuit 14. This is required so that the output of comparator 18a is always black when the input signal represents a steady free air black.

Comparator circuit 18a includes an amplifier 18b and resistor 18c. When the input signal from the reader presented through resistor 18c is greater than the reference level provided at the positive input to amplifier 18b, its output goes negative, representing the reading of a white bar. Conversely, when the input signal level is less than the reference level, the output of amplifier 18b goes positive, indicating a black bar.

Other embodiments will occur to those skilled in the art and are within the following claims.

What is claimed is:

1. A follower response control circuit for a system for reading binary coded information and providing a reader signal with positive levels representing the first binary state and negative levels representing the second binary state, and having a positive peak follower circuit and a negative peak follower circuit, each of which includes means for defining a pre-established time constant for producing, respectively, a positive peak signal and a negative peak signal in response to the reader signal, comprising:
    means for defining a second time constant for one of said peak follower circuits;
    switching means for selectively switching said means for defining a second time constant in and out of said one of said peak follower circuits;
    a direction detector circuit for determining whether the reader signal level is moving toward the polarity of the peaks followed by said one of said peak follower circuits;
    a level detector circuit for determining whether the reader signal level is in the one of said states represented by the polarity of the peaks which said one of said peak follower circuit follows; and
    a switch control circuit responsive to said detector circuits for operating said switching means to introduce said means for defining a second time constant into said one of said peak follower circuits to alter temporarily the pre-established time constant of that peak follower circuit during the period when the reader signal level is moving toward and is in the one of said states represented by the polarity of the peaks followed by said one of said follower circuits.

2. A follower response control circuit for a reference level establishing system, including positive and negative follower circuits, each having means for defining a pre-established time constant for producing, respectively, a positive peak signal and a negative peak signal in response to an input signal, and means responsive to said peak signals for establishing a reference level, comprising:
    means for defining a second time constant for one of said follower circuits;
    switching means for selectively switching said means for defining a second time constant in and out of said one of said follower circuits;
    a direction detector circuit for determining whether the input signal level is moving toward the polarity of the peaks followed by said one of said follower circuits;
    a level detector circuit for determining whether the input signal level is of the same polarity relative to the reference level as the polarity of the peaks followed by said one of said follower circuits; and
    a switch control circuit responsive to said detector circuits for operating said switching means to introduce said means for defining a second time constant into said one of said follower circuits to alter temporarily the pre-established time constant of that follower circuit during the period when the input signal level is moving toward, and is of the same polarity relative to the reference level as, the polarity of the peaks followed by said one of said follower circuits.

3. The follower response control circuit of claim 2 in which said direction detector circuit is a differentiator circuit.

4. The follower response control circuit of claim 2 in which said level detector circuit is a comparator circuit.

5. The follower response control circuit of claim 2 in which said switch control circuit is a logic gate.

6. The follower response control circuit of claim 2 in which said one of said peak follower circuits is the negative peak follower circuit, said direction detector circuit detects the input signal going negative and said level detector circuit detects the negative level relative to the reference level.

7. The follower response control circuit of claim 2 further including means for confining said input signal peaks within predetermined limits including means for shifting said input signal by a fixed value and means for restoring said shifted input signal to a fixed d.c. level independent of the original level of the input signal.

8. A follower response control circuit for a reference level establishing system including positive and negative follower circuits, each having means for defining a pre-established time constant for producing, respectively, a positive peak signal and a negative peak signal, in response to an input signal, and means responsive to the peak signals for establishing a reference level, comprising:
    means for defining a second time constant for said negative follower circuit;
    switching means for selectively switching said means for providing a second time constant in and out of said negative follower circuit;
    a direction detector circuit for determining whether the input signal level is moving in the negative direction;
    a level detector circuit for determining whether the input signal level is negative relative to the reference level; and
    a switch control circuit responsive to said detector circuits for operating said switching means to introduce said means for defining a second time constant into said negative follower circuit to alter temporarily the pre-established time constant of the negative follower circuit during the period when the input signal level is moving in the negative direction and is negative relative to the reference level.

* * * * *